United States Patent
Hu et al.

(10) Patent No.: US 11,644,841 B2
(45) Date of Patent: May 9, 2023

(54) ROBOT CLIMBING CONTROL METHOD AND ROBOT

(71) Applicant: UBTECH ROBOTICS CORP LTD, Shenzhen (CN)

(72) Inventors: Shuping Hu, Shenzhen (CN); Jun Cheng, Shenzhen (CN); Jingtao Zhang, Shenzhen (CN); Miaochen Guo, Shenzhen (CN); Dong Wang, Shenzhen (CN); Jianxin Pang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 319 days.

(21) Appl. No.: 17/113,132

(22) Filed: Dec. 7, 2020

(65) Prior Publication Data

US 2021/0181747 A1 Jun. 17, 2021

(30) Foreign Application Priority Data

Dec. 11, 2019 (CN) .......................... 201911266155.9

(51) Int. Cl.
*G05D 1/02* (2020.01)
*G06T 7/73* (2017.01)
*G06T 7/13* (2017.01)
*B62D 57/02* (2006.01)
*G06T 1/00* (2006.01)

(52) U.S. Cl.
CPC .......... *G05D 1/0212* (2013.01); *B62D 57/02* (2013.01); *G05D 1/0231* (2013.01); *G06T 1/0014* (2013.01); *G06T 7/13* (2017.01); *G06T 7/73* (2017.01)

(58) Field of Classification Search
CPC ...... G05D 1/0212; G05D 1/0231; G06T 7/73; G06T 7/13; G06T 1/0014; B62D 57/02; G02D 1/0231
USPC .......................................................... 701/124
See application file for complete search history.

(56) References Cited

U.S. PATENT DOCUMENTS

| | | | |
|---|---|---|---|
| 11,446,810 B1* | 9/2022 | Chua | B25J 19/023 |
| 2011/0231016 A1* | 9/2011 | Goulding | G05D 1/0088 |
| | | | 901/1 |
| 2012/0155775 A1* | 6/2012 | Ahn | G06T 7/73 |
| | | | 701/527 |
| 2017/0168472 A1* | 6/2017 | Ando | G06F 9/44521 |
| 2018/0005054 A1* | 1/2018 | Yu | G06K 9/6293 |
| 2019/0291277 A1* | 9/2019 | Oleynik | B25J 9/1697 |
| 2020/0047337 A1* | 2/2020 | Williams | B25J 9/163 |
| 2020/0324412 A1* | 10/2020 | Whitman | G05D 1/0246 |
| 2022/0366494 A1* | 11/2022 | Cella | G06Q 40/04 |

FOREIGN PATENT DOCUMENTS

WO WO2005087452 A1 9/2005

* cited by examiner

*Primary Examiner* — Yazan A Soofi

(57) ABSTRACT

A robot climbing control method is disclosed. A gravity direction vector in a gravity direction in a camera coordinate system of a robot is obtained. A stair edge of stairs in a scene image is obtained and an edge direction vector of the stair edge in the camera coordinate system is determined. A position parameter of the robot relative to the stairs is determined according to the gravity direction vector and the edge direction vector. Poses of the robot are adjusted according to the position parameter to control the robot to climb the stairs.

20 Claims, 4 Drawing Sheets

US 11,644,841 B2

ROBOT CLIMBING CONTROL METHOD AND ROBOT

CROSS REFERENCE TO RELATED APPLICATIONS

This application claims priority to Chinese Patent Application No. 201911266155.9, filed Dec. 11, 2019, which is hereby incorporated by reference herein in its entirety.

BACKGROUND

1. Technical Field

The present disclosure relates to a robot technical field, and more particularly to a robot climbing control method and robot.

2. Description of Related Art

In order to improve mobility of a robot, the robot needs to be able to effectively adapt to movement requirements in different scenarios. For example, with respect to an indoor scenario, enhancement of stair climbing of the robot is necessary, that is, enhancement of the ability to stair climbing of the robot.

Due to nonstationarity of a humanoid robot, i.e. a legged robot, under a moving process, poses of the humanoid robot are greatly changed, it is necessary to calculate, in real time, rotation matrixes of a world coordinate system relative to a robot coordinate system. The current scheme usually determines the rotation matrixes of the world coordinate system relative to the robot coordinate system by extracting identification information on the stairs. When the identification information is missed in a scene, the robot cannot be effectively control to climb the stairs.

DETAILED DESCRIPTION

To clarify the purpose, technical solutions, and the advantages of the disclosure, embodiments of the invention will now be described more fully hereinafter with reference to the accompanying drawings, in which embodiments of the invention are shown.

As used herein, the term "main control process" refers to a computer-implemented process/method for a physical component. The main control process may be a sub-process, in one example.

FIG. 1a is a flowchart of a robot climbing control method in accordance with an embodiment of the present disclosure, which is detailed as follows:

In step S101, a gravity direction vector in a gravity direction in a camera coordinate system of a robot obtained.

Specifically, the stairs in the climbing control method described of this application refer to stairs with horizontal stair surfaces, while the gravity direction is the direction perpendicular to the horizontal plane.

The robot described in this application may be a humanoid robot with two legs. When the robot works in a horizontally stationary state, the XOY plane of the camera coordinate system of the robot is usually parallel to the horizontal plane. When the robot walks horizontally or climbs a building, the two-legged robot switches between a supported leg and a unsupported leg, and, when the unsupported leg changes positions, the position and inclination of a camera of the two-legged robot are changed. Since the gravity direction is always perpendicular to the horizontal direction, the change in the pose of the robot can be expressed according to the direction vector in the gravity direction in the camera coordinate system of the robot.

Figure 2:
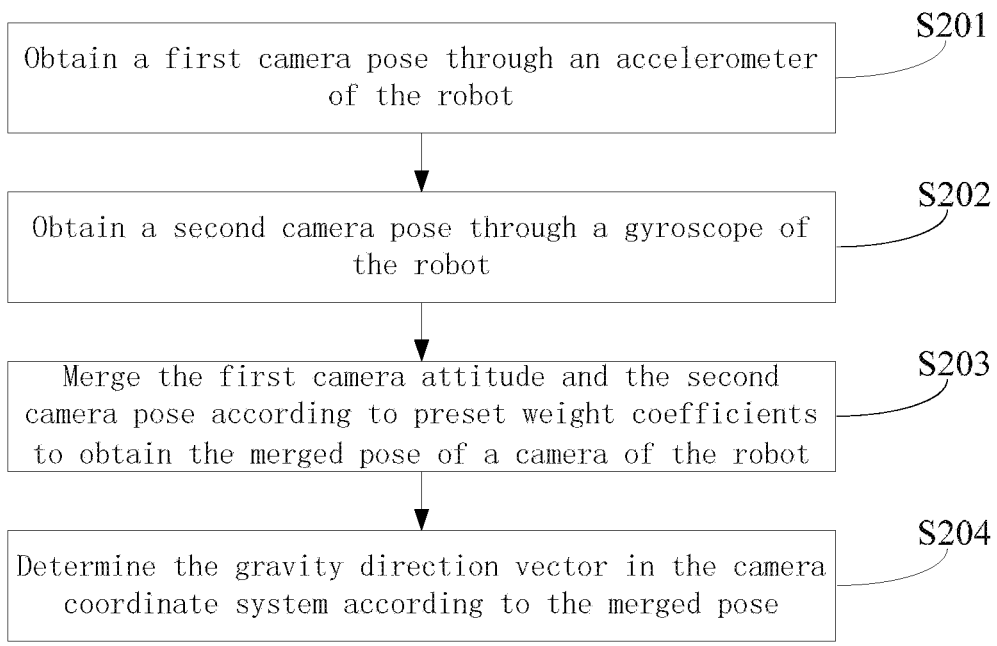
FIG. 2 is a flowchart of a method of obtaining a gravity direction vector in a camera coordinate system of the robot in accordance with an embodiment of the present disclosure.

The steps of obtaining the gravity direction vector in the camera coordinate system of the robot are specifically described in FIG. 2, comprising:

In step S201, a first camera pose is obtained through an accelerometer of the robot.

Acceleration change generated when the position of the robot changes is obtained through the accelerometer of the robot. For example, acceleration components in a three-axis direction of the robot can be collected using a three-axis accelerometer. An acceleration value of the robot can be synthesized via the acceleration components in the three-axis direction. The first camera pose of the robot can be obtained according to transformations of the poses of the robot in various directions.

In step S202, a second camera pose is obtained through a gyroscope of the robot.

The gyroscope equipped inside the robot can collect angle change information of the robot. The second camera pose of the robot can be determined according to combination of the initial camera pose of the robot and the updated pose information of the gyroscope.

In step S203, the first camera attitude and the second camera pose are merged according to preset weight coefficients to obtain the merged pose of a camera of the robot.

The preset weight coefficients refer to that credibility of the first camera pose and credibility of the second camera pose can be served as weights and the merged pose of the first camera pose and the second camera pose are generated according to the weights. The values of the camera poses can be obtained according to the credibility of the first camera pose and the credibility of the second camera pose using the Hough detection algorithm. A new camera pose in the next moment can be further estimated according to the calculated values of the camera poses.

In step S204, the gravity direction vector in the camera coordinate system is determined according to the merged pose.

After the camera pose is determined, the camera coordinate system corresponding to the camera can be determined. The change in the gravity direction relative to the camera coordinate system can be determined according to the change of the camera coordinate system relative to the initial position, so that the gravity direction vector of the robot in the camera coordinate system can be determined.

In step S102, a stair edge of stairs in a scene image is obtained and an edge direction vector of the stair edge in the camera coordinate system is determined.

In order to effectively control the robot to climb the stairs, including control scenes like upstairs controls and downstairs controls, it is necessary to collect image information in the scenes through a camera. The image information may include RGB images and depth images.

Figure 3:
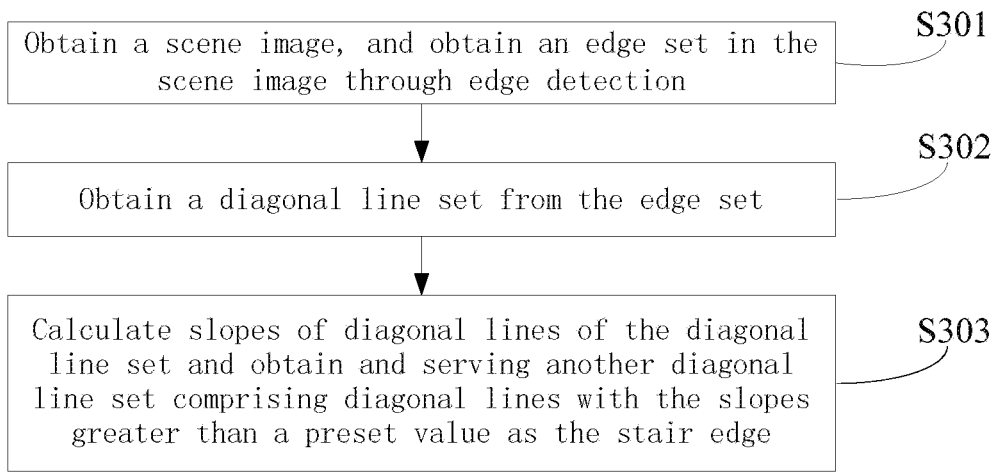
FIG. 3 is a flowchart of a method of obtaining an edge of stairs in a scene image in accordance with an embodiment of the present disclosure.

The process of obtaining an edge of stairs in a scene image as shown in FIG. 3, comprising:

In step S301, a scene image is obtained and an edge set in the scene image is obtained through edge detection.

The RGB image and the depth image of the scene where the robot is located can be collected by a robot camera, and the edge set included in the RGB image can be obtained using an edge detection algorithm. The edge detection algorithm may include a double threshold value detection algorithm, a first-order differential operator detection algorithm, and the like.

In step S302, a diagonal line set is obtained from the edge set.

Before the diagonal line set is obtained, the depth information of the edge may also be acquired according to corresponding relationship between the edge in the RGB image and the depth image. Furthermore, edges with the depth less than a preset threshold value can be filtered through a preset depth threshold value.

Line detection is performed on the edges in the edge set using the Hough detection algorithm to obtain the diagonal lines included in the edge set and obtain the diagonal line set formed by the diagonal lines included in the edge set.

In step S303, slopes of the diagonal lines of the diagonal line set are calculated and another diagonal line set comprising diagonal lines with the slopes greater than a preset value are obtained and served as the stair edge.

In one embodiment, before the slopes of the diagonal lines are counted, the diagonal lines in the diagonal line set may be deduplicated, that is, the positions of the diagonal lines in the diagonal line set are obtained. The diagonal lines with the same positions are merged according to the positions of the diagonal lines. The positions of the diagonal lines can be determined according to the coordinate positions of points on the diagonal lines. The coordinate points of the points on the diagonal lines in the camera coordinates can be collected according to preset time intervals. One diagonal line is determined whether it is the same with another diagonal line according to the repetition rate of the coordinate points.

Statistical data of the slopes of the diagonal line is obtained by counting the slopes of each of the diagonal lines in the diagonal line set. Probabilities of different slopes can be calculated based on statistical data. The diagonal line corresponding to the slope with the highest probability can be obtained and served as the stair edge. The edge direction vector of the edge of the stairs in the camera coordinate system can be obtained according to the determined stair edge. The edge direction vector of the stair edge in the camera coordinate system is determined according to the coordinates of the pixel points in the stair edge in the camera coordinate system.

In step S103, a position parameter of the robot relative to the stairs is determined according to the gravity direction vector and the edge direction vector.

In the embodiment of the present application, the position parameter of the robot relative to the stairs may be the height, distance, and included angle of the nearest stairs (not including the stairs where the robot is currently located) of the robot relative to the leg of the robot.

Figure 4:
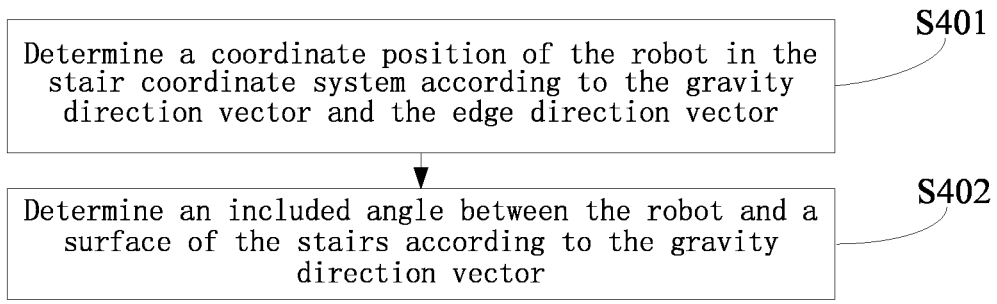
FIG. 4 is a flowchart of a method of determining position parameters of the robot relative to the stairs according to the gravity direction vector and an edge direction vector in accordance with an embodiment of the present disclosure.

The method of determining position parameters of the robot relative to the stairs according to the gravity direction vector and an edge direction vector is shown in FIG. 4, comprising:

In step S401, a coordinate position of the robot in the stair coordinate system is determined according to the gravity direction vector and the edge direction vector.

Specifically, a distance of the robot relative to the surface of the stair in the stair coordinate system is determined according to the gravity direction vector and the edge direction vector.

A spatial position of the surface of the stairs can be obtained according to the edge direction vector. The distance from the center point of the robot to the surface of the stair can be calculated according to the center point of the robot included in the gravity direction vector of the robot and direction information of the gravity direction vector.

An orientation of the robot relative to the surface of the stair in the stair coordinate system is determined according to the gravity direction vector of the gravity direction in the camera coordinate system.

Change information of the orientation of the robot relative to the initial horizontal orientation can be determined via the direction of the gravity direction vector in the camera coordinate system. When the surface of the stair is usually a horizontal plane, the orientation of the robot relative to the surface of the stair in the stair coordinate system can be obtained.

The vertical height and horizontal distance of the robot relative to the surface of the stair can be obtained according to the distance and orientation of the robot relative to the surface of the stairs in the stair coordinate system.

In step S402, an included angle between the robot and a surface of the stairs is determined according to the gravity direction vector.

The orientation change information of the robot relative to the initial horizontal orientation can be determined through the direction of the gravity direction vector in the camera coordinate system. As the surface of the stair is usually a horizontal plane, the orientation of the robot relative to the surface of the stair in the stair coordinate system can be obtained, that is, the included angle between the robot and the surface of the stair.

In step S104, poses of the robot are adjusted according to the position parameter to control the robot to climb the stairs.

When the position parameters, including the horizontal distance and vertical height of the robot relative to the stairs and the included angle between the robot and the stairs, of the robot relative to the stairs are determined, the position parameters of the robot can be adjusted according to the difference between the current position parameters and the standard climbing parameters, thereby effectively controlling the robot to complete climbing operations.

It should be understood that the size of the sequence number of each step in the foregoing embodiments does not mean the execution sequences. The execution sequence of each process should be determined by its function and internal logics, and should not constitute any limitation on the implementation process of the embodiments of the present application.

Figure 5:
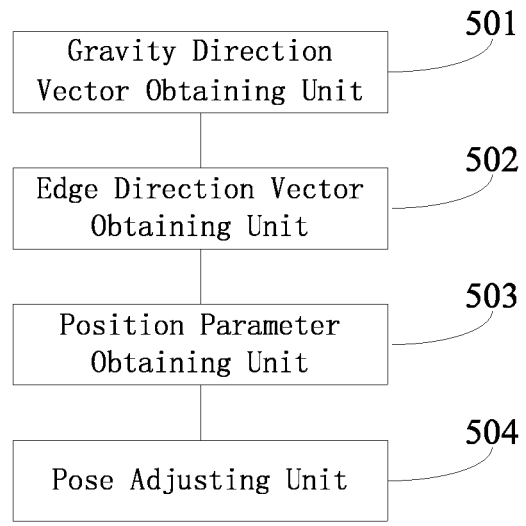
FIG. 5 is a block diagram of functional blocks of a robot climbing control device in accordance with an embodiment of the present disclosure.

FIG. 5 is a block diagram of functional blocks of a robot climbing control device in accordance with an embodiment of the present disclosure, which is detailed as follows:

The robot climbing control device comprises:

A gravity direction vector obtaining unit 501, configured to obtain a gravity direction vector in a gravity direction in a camera coordinate system of a robot.

An edge direction vector obtaining unit 502, configured to obtain a stair edge of stairs in a scene image and determine an edge direction vector of the stair edge in the camera coordinate system.

A position parameter obtaining unit 503, configured to determine a position parameter of the robot relative to the stairs according to the gravity direction vector and the edge direction vector.

A pose adjusting unit 504, configured to adjust poses of the robot according to the position parameter to control the robot to climb the stairs.

Figure 1:
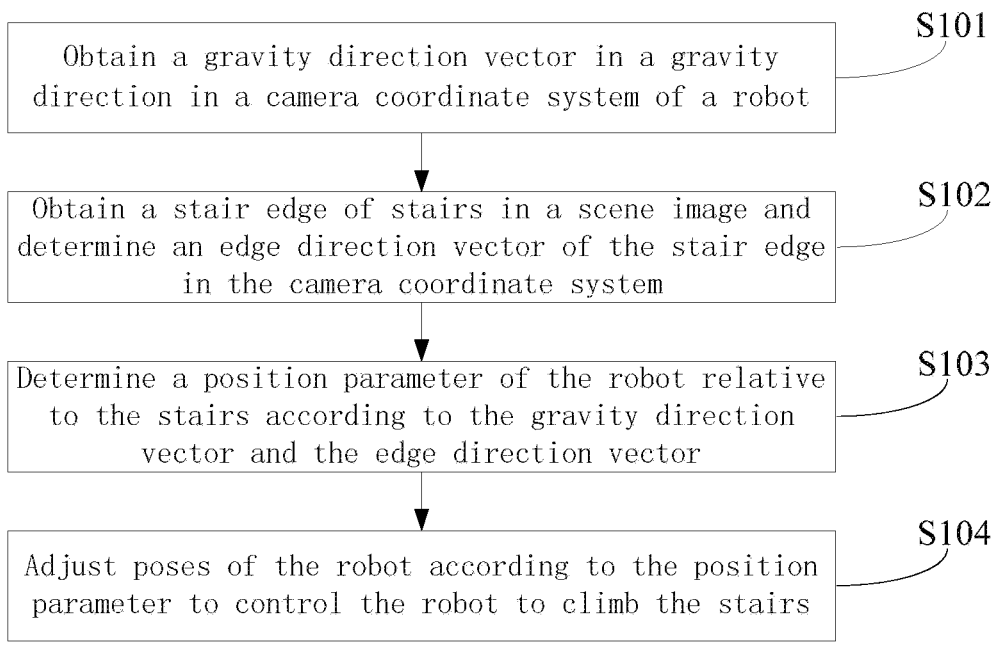
FIG. 1 is a flowchart of a robot climbing control method in accordance with an embodiment of the present disclosure.

The robot climbing control device described in FIG. 5 corresponds to the robot climbing control method described in FIG. 1.

In addition, the robot climbing control device may also be implemented as a robot climbing control system by software or hardware.

Figure 6:
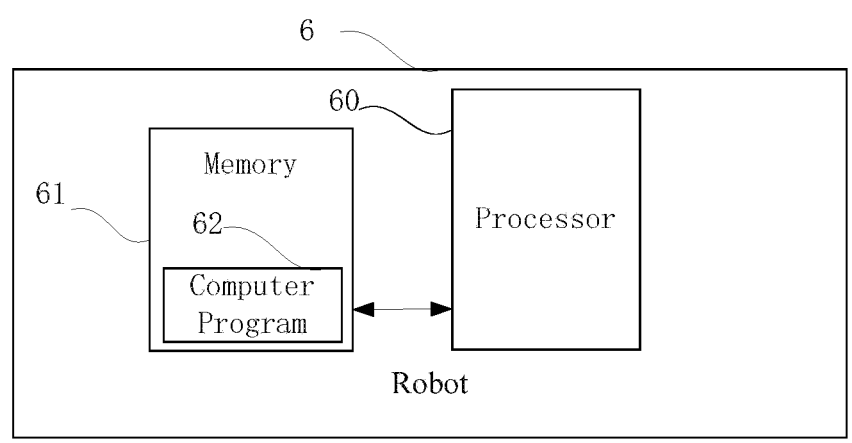
FIG. 6 is a block diagram of the hardware architecture of the robot in accordance with an embodiment of the present disclosure.

FIG. 6 is a block diagram of the hardware architecture of the robot in accordance with an embodiment of the present disclosure. As shown in FIG. 6, the robot 6 of this embodiment includes a processor 60, a memory 61 and a computer program 62 stored in the memory 61 and running on the processor 60, such as a robot stair climbing control program. When the processor 60 executes the computer program 62, the steps in the above embodiments of the robot climbing control method are implemented. Alternatively, when the processor 60 executes the computer program 62, the functions of the modules/units in the foregoing device embodiments are implemented.

Exemplarily, the computer program 62 may be divided into one or more modules/units. The one or more modules/units are stored in the memory 61 and executed by the processor 60 to complete the application. The one or more modules/units may be a series of computer program instruction segments capable of completing specific functions. The instruction segments are used to describe the execution process of the computer program 62 in the robot 6. For example, the computer program 62 can be divided into:

A gravity direction vector obtaining unit, configured to obtain a gravity direction vector in a gravity direction in a camera coordinate system of a robot.

An edge direction vector obtaining unit, configured to obtain a stair edge of stairs in a scene image and determine an edge direction vector of the stair edge in the camera coordinate system.

A position parameter obtaining unit, configured to determine a position parameter of the robot relative to the stairs according to the gravity direction vector and the edge direction vector.

A pose adjusting unit, configured to adjust poses of the robot according to the position parameter to control the robot to climb the stairs.

The robot may include, but is not limited to, a processor 60 and a memory 61. Those skilled in the art can understand that FIG. 6 is only an example of the robot 6 and does not constitute a limitation on the robot 6. It may include more or less parts than the parts shown in the figures, or combine some parts, or include different parts. For example, the robot may also include input and output devices, network access devices, buses and the like.

The processor 60 may be a central processing unit (CPU), or another general-purpose processor, an universal processor, a digital signal processor (DSP), an application specific integrated circuit (ASIC), a field-programmable gate array (FPGA), a programmable logic device, a discrete gate or transistor logic, or a discrete hardware component. The universal processor may be a microprocessor or a conventional processor.

The memory 61 may be an internal storage unit of the robot 6, such as a hard disk or a memory of the robot 6. The memory 61 may also be an external storage device of the robot 6, such as a plug-in hard disk equipped on the robot 6, a smart memory card (Smart Media Card, SMC), a Secure Digital (SD) card, a Flash Card, etc. Further, the memory 61 may also include both an internal storage unit of the robot 6 and an external storage device. The memory 61 is used to store the computer readable instructions and other programs and data required by the robot. The memory 61 can also be used to temporarily store data that has been output or will be output.

It should be noted that the information exchange and execution processes among the above-mentioned devices/units are based on the same concept as the embodiments of the method of this application. The specific functions and technical effects of the present disclosure can be found in the embodiments of the methods, which is not repeated here.

The person skilled in the art may clearly understand that for the convenience and simplicity of the description, the function units and the units described in above are merely examples. Practically, the functions may be accomplished by different function units or units. That is, the internal structure of the device may include different function units or units to accomplish the total or partial functions described in above. Each of the functional units in the various embodiments of the present invention may be integrated into one processing unit. Each of the units may be physically present, or two or more units may be integrated into one unit. The above-mentioned integrated unit can be implemented either in the form of hardware or in the form of computer programs functional units. In addition, the name of each of the function units and the units is merely for the convenience of distinguishing one and the other, and may not limit the claim scope of the present disclosure. The operational process of the units within the system may refer to the process of the embodiment of the method, and may not be described again.

In the above-mentioned embodiments, the description of each embodiment has its own focus. For parts that are not detailed or recorded in an embodiment, reference may be made to related descriptions of other embodiments.

The person skilled in the art may notice that the steps and the units described in the present disclosure may be achieved by the electronic components or the combination of the computer programs and the electronic components. The detailed specification may determine whether the functions are achieved by the electronic components or the computer programs. The person skilled in the art may adopt different ways, which does not beyond the scope of the present disclosure, to achieve each of the specific applications.

In addition, each of the functional units in the various embodiments of the present invention may be integrated into one processing unit. Each of the units may be physically present, or two or more units may be integrated into one unit. The above-mentioned integrated unit can be implemented either in the form of hardware or in the form of software functional units.

The integrated modules/units in the above-described other embodiments may be stored in a computer-readable storage medium when being implemented in the form of software functional units and are sold or used as stand-alone products. Based on this understanding, the technical solution of the present disclosure, either essentially or in part, contributes to the prior art, or all or part of the technical solution may be embodied in the form of a software product stored in a storage medium. In an example, the computer-readable storage medium includes a number of instructions for enabling a computer device (which may be a personal computer, a server, a network device, etc.) or a processor to perform all or part of the steps of the methods described in the various embodiments of the present disclosure. The aforementioned storage medium includes a variety of media such as a USB disk, a mobile hard disk, a read-only memory (ROM), a random access memory (RAM), a magnetic disk, an optical disk, carrier signals, electronic signals, the software distribution medium, and so on. It is noted that the content of the computer-readable storage medium may be increased or decreased according to the jurisdictions and the practice. For example, the computer-readable storage medium may not include the carrier signals and the transmission signals in some jurisdictions.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A robot climbing control method, comprising:
    obtaining a gravity direction vector in a gravity direction in a camera coordinate system of a robot;
    obtaining a stair edge of stairs in a scene image and determining an edge direction vector of the stair edge in the camera coordinate system;
    determining a position parameter of the robot relative to the stairs according to the gravity direction vector and the edge direction vector; and
    adjusting poses of the robot according to the position parameter to control the robot to climb the stairs;
    wherein the step of obtaining the gravity direction vector in the gravity direction in a camera coordinate system of a robot further comprises:
        obtaining a first camera pose through an accelerometer of the robot;
        obtaining a second camera pose through a gyroscope of the robot;
        merging the first camera attitude and the second camera pose according to preset weight coefficients to obtain the merged pose of a camera of the robot; and
        determining the gravity direction vector in the camera coordinate system according to the merged pose; and
    wherein the step of obtaining the stair edge of stairs in the scene image further comprises:
        obtaining a scene image, and obtaining an edge set in the scene image through edge detection;
        obtaining a diagonal line set from the edge set; and
        calculating slopes of diagonal lines of the diagonal line set and obtaining and serving another diagonal line set comprising diagonal lines with the slopes greater than a preset value as the stair edge.

2. The method according to claim 1, before the step of calculating slopes of diagonal lines of the diagonal line set, further comprising:
    obtaining positions of the diagonal lines in the diagonal line set; and
    merging the diagonal lines having the same positions according to the positions of the diagonal lines.

3. The method according to claim 1, wherein the step of determining the edge direction vector of the stair edge in the camera coordinate system further comprises:
    obtaining coordinates of pixel points on the stair edge in the camera coordinate system; and
    determining the edge direction vector of the stair edge of the stairs in the camera coordinate system according to the coordinates of pixel points on the stair edge in the camera coordinate system.

4. The method according to claim 3, wherein the step of determining the position parameter of the robot relative to the stairs according to the gravity direction vector and the edge direction vector further comprises:
    determining a coordinate position of the robot in the stair coordinate system according to the gravity direction vector and the edge direction vector; and
    determining an included angle between the robot and a surface of the stairs according to the gravity direction vector.

5. The method according to claim 4, wherein the step of determining the coordinate position of the robot in the stair coordinate system according to the gravity direction vector and the edge direction vector further comprises:
    determining a distance of the robot relative to the surface of the stair in the stair coordinate system according to the gravity direction vector and the edge direction vector; and
    determining an orientation of the robot relative to the surface of the stair in the stair coordinate system according to the gravity direction vector of the gravity direction in the camera coordinate system.

6. A robot climbing control system, comprising at least one processor configured to:
    obtain a gravity direction vector in a gravity direction in a camera coordinate system of a robot;
    obtain a stair edge of stairs in a scene image and determine an edge direction vector of the stair edge in the camera coordinate system;
    determine a position parameter of the robot relative to the stairs according to the gravity direction vector and the edge direction vector; and
    adjust poses of the robot according to the position parameter to control the robot to climb the stairs;
    wherein the at least one processor is further configured to:
        obtain a first camera pose through an accelerometer of the robot;
        obtain a second camera pose through a gyroscope of the robot;
        merge the first camera attitude and the second camera pose according to preset weight coefficients to obtain the merged pose of a camera of the robot; and
        determine the gravity direction vector in the camera coordinate system according to the merged pose; and
    wherein the at least one processor is further configured to:
        obtain a scene image, and obtaining an edge set in the scene image through edge detection;
        obtain a diagonal line set from the edge set; and
        calculate slopes of diagonal lines of the diagonal line set and obtaining and serve another diagonal line set comprising diagonal lines with the slopes greater than a preset value as the stair edge.

7. The system according to claim 6, wherein the at least one processor is further configured to:
    obtain positions of the diagonal lines in the diagonal line set; and
    merge the diagonal lines having the same positions according to the positions of the diagonal lines.

8. The system according to claim 6, wherein the at least one processor is further configured to:
obtain coordinates of pixel points on the stair edge in the camera coordinate system; and
determine the edge direction vector of the stair edge of the stairs in the camera coordinate system according to the coordinates of pixel points on the stair edge in the camera coordinate system.

9. The system according to claim 8, wherein the relative position information comprises the height and distance of the robot relative to the target step, the at least one processor is further configured to:
determine a coordinate position of the robot in the stair coordinate system according to the gravity direction vector and the edge direction vector; and
determine an included angle between the robot and a surface of the stairs according to the gravity direction vector.

10. The system according to claim 9, wherein the at least one processor is further configured to:
determine a distance of the robot relative to the surface of the stair in the stair coordinate system according to the gravity direction vector and the edge direction vector; and
determine an orientation of the robot relative to the surface of the stair in the stair coordinate system according to the gravity direction vector of the gravity direction in the camera coordinate system.

11. A non-transitory computer-readable medium having stored thereon computer instructions, when executed by at least one processor, perform a robot climbing control method, the method comprising:
obtaining a gravity direction vector in a gravity direction in a camera coordinate system of a robot;
obtaining a stair edge of stairs in a scene image and determining an edge direction vector of the stair edge in the camera coordinate system;
determining a position parameter of the robot relative to the stairs according to the gravity direction vector and the edge direction vector; and
adjusting poses of the robot according to the position parameter to control the robot to climb the stairs;
wherein the step of obtaining the stair edge of stairs in the scene image further comprises:
obtaining a scene image, and obtaining an edge set in the scene image through edge detection;
obtaining a diagonal line set from the edge set; and
calculating slopes of diagonal lines of the diagonal line set and obtaining and serving another diagonal line set comprising diagonal lines with the slopes greater than a preset value as the stair edge.

12. The non-transitory computer-readable medium according to claim 11, wherein the step of obtaining the gravity direction vector in the gravity direction in a camera coordinate system of a robot further comprises:
obtaining a first camera pose through an accelerometer of the robot;
obtaining a second camera pose through a gyroscope of the robot;
merging the first camera attitude and the second camera pose according to preset weight coefficients to obtain the merged pose of a camera of the robot; and
determining the gravity direction vector in the camera coordinate system according to the merged pose.

13. The non-transitory computer-readable medium according to claim 11, wherein before the step of calculating slopes of diagonal lines of the diagonal line set, the method further comprises:
obtaining positions of the diagonal lines in the diagonal line set; and
merging the diagonal lines having the same positions according to the positions of the diagonal lines.

14. The non-transitory computer-readable medium according to claim 11, wherein the step of determining the edge direction vector of the stair edge in the camera coordinate system further comprises:
obtaining coordinates of pixel points on the stair edge in the camera coordinate system; and
determining the edge direction vector of the stair edge of the stairs in the camera coordinate system according to the coordinates of pixel points on the stair edge in the camera coordinate system.

15. The non-transitory computer-readable medium according to claim 14, wherein the step of determining the position parameter of the robot relative to the stairs according to the gravity direction vector and the edge direction vector further comprises:
determining a coordinate position of the robot in the stair coordinate system according to the gravity direction vector and the edge direction vector; and
determining an included angle between the robot and a surface of the stairs according to the gravity direction vector.

16. The non-transitory computer-readable medium according to claim 15, wherein the step of determining the coordinate position of the robot in the stair coordinate system according to the gravity direction vector and the edge direction vector further comprises:
determining a distance of the robot relative to the surface of the stair in the stair coordinate system according to the gravity direction vector and the edge direction vector; and
determining an orientation of the robot relative to the surface of the stair in the stair coordinate system according to the gravity direction vector of the gravity direction in the camera coordinate system.

17. The non-transitory computer-readable medium according to claim 11, wherein before the step of obtaining the diagonal line set from the edge set, the method further comprises:
obtaining depth information of each edge in the edge set according to a corresponding relationship between the each edge in the RGB image and the depth image; and
filtering edges with a depth less than a preset threshold value through a preset depth threshold value.

18. The non-transitory computer-readable medium according to claim 11, wherein the step of obtaining the diagonal line set from the edge set further comprises:
performing a line detection on edges in the edge set using a Hough detection algorithm to obtain diagonal lines included in the edge set; and
obtaining the diagonal line set formed by the diagonal lines included in the edge set.

19. The non-transitory computer-readable medium according to claim 11, wherein the position parameter of the robot relative to the stairs comprises a height, a distance, and an included angle of nearest stairs of the robot relative to a leg of the robot, and wherein the nearest stairs do not comprise stairs where the robot is currently located.

20. The non-transitory computer-readable medium according to claim 11, wherein the poses of the robot is adjusted according to a difference between the position parameter and a preset standard climbing parameter.

\* \* \* \* \*